VOLUME LIMITER CIRCUIT

Filed May 8, 1950

INVENTOR
EDWIN C. MILLER

BY Herman L. Gordon
ATTORNEY

Patented May 25, 1954 2,679,626

UNITED STATES PATENT OFFICE 2,679,626

VOLUME LIMITER CIRCUIT

Edwin C. Miller, Havre, Mont., assignor to Northwest Radio Consultant Service, Hill County, Mont., a partnership Application May 8, 1950, Serial No. 160,725

7 Claims. (Cl. 323—22)

This invention relates to electronic devices for the amplitude control of audio frequencies, and more particularly to circuits for compressing or limiting the output amplitude over a wide range of input amplitudes at audio frequencies.

A main object of the invention is to provide a novel and improved volume limiting circuit which is very simple in construction, which involves only a few parts, and which is very reliable in operation.

A further object of the invention is to provide an improved volume-limiting or volume-compressing system employing electronic voltage-dividing means, which is very inexpensive to construct, which is very stable in operation, and which provides very close limiting action over a wide range of changes in input level, whereby the output level of the system is maintained substantially at a predetermined desired value.

Further objects and advantages of the invention will become apparent from the following description and claims, and from the accompanying drawings, wherein:

Figures 1, 2, 3:
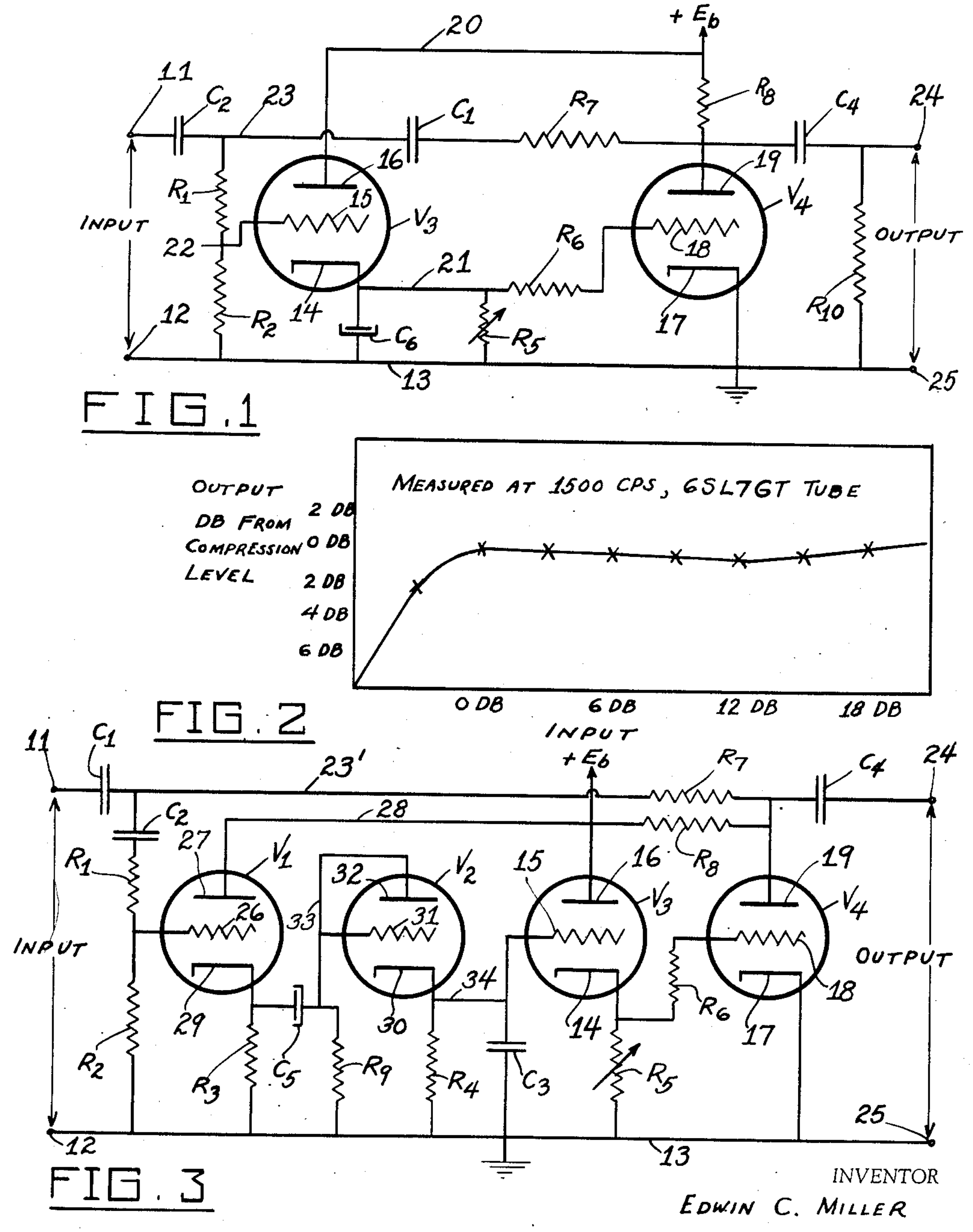
Figure 1 is a schematic wiring diagram illustrating one form of improved volume-limiting or volume-compressing circuit constructed in accordance with the present invention.
Figure 2 is a graph illustrating a typical set of performance test results obtained from the system shown in Figure 1.
Figure 3 is a schematic circuit diagram illustrating a modified form of volume-limiting circuit according to the present invention.

A primary purpose of the present invention consists in providing a volume control circuit in the general nature of a potentiometer, wherein the input signal is impressed across the terminals of the "potentiometer" and the output is obtained across a portion of the "potentiometer" whose resistance varies in an inverse manner with respect to variations in the amplitude of the input signal. The invention further contemplates providing several different methods of causing the variation of the resistance of the output portion of the "potentiometer." In certain preferred methods contemplated herein, the plate-to-cathode resistance of a vacuum tube is employed as the output portion of the "potentiometer," and variation of this resistance is accomplished by varying the voltage on the grid of the tube. According to the invention, the voltage on said grid is made to vary in accordance with the variation of the amplitude of the input signal. Therefore, as the amplitude of the input signal increases, the voltage on said grid increases, causing the effective plate-to-cathode resistance of the vacuum tube to decrease, thereby lowering the ratio of the resistance of the output portion of the "potentiometer" to the total resistance of the "potentiometer," whereby the ratio of the output voltage to the input voltage is reduced. It will be shown that by a proper selection of circuit values, the output signal amplitude may be maintained substantially constant over a wide range of variation of input signal amplitudes.

Referring to the drawings, and more particularly to Figure 1, showing one embodiment of the present invention, 11 designates one input terminal of the circuit and 12 designates the other input terminal. Terminal 12 is connected to the grounded wire 13. Designated at $V_3$ is a triode having a cathode 14, a grid 15 and a plate 16. Designated at $V_4$ is another triode having a cathode 17, a grid 18 and a plate 19.

Plate 16 of triode $V_3$ is connected by a wire 20 to the positive terminal of the power supply, shown at $E_b$. Connected to cathode 14 is a wire 21, and connected between wire 21 and ground wire 13 is a variable load resistor $R_5$. A suitable filter condenser $C_6$ is connected between cathode 14 and ground wire 13. Wire 21 is connected through a grid resistor $R_6$ to the grid 18 of triode $V_4$. Cathode 17 of triode $V_4$ is connected to ground wire 13. Plate 19 is connected through a plate resistor $R_8$ to the positive terminal of the power supply $E_b$.

Grid 15 of triode $V_3$ is connected at 22 to the junction of a pair of resistors $R_1$ and $R_2$, as shown. The remaining terminal of resistor $R_2$ is connected to the ground wire 13. The remaining terminal of resistor $R_1$ is connected to a wire 23. A coupling condenser $C_2$ is connected between input terminal 11 and said remaining terminal of resistor $R_1$. Connected between wire 23 and the plate 19 of triode $V_4$ is a coupling condenser $C_1$ and a resistor $R_7$.

The output terminals of the circuit are shown at 24 and 25. Terminal 25 is connected to ground wire 13. Plate 19 of triode $V_4$ is connected to terminal 24 through a coupling condenser $C_4$. A suitable load resistor $R_{10}$ may be connected across the output terminals 24 and 25.

The operation of the circuit of Figure 1 is as follows:

As the input signal, applied at terminals 11 and 12, to triode $V_3$ increases in amplitude, the rectified voltage appearing across the cathode resistor $R_5$ increases proportionately and causes current to flow through resistor $R_6$ and the grid-cathode circuit of triode $V_4$. Over a certain range of input voltage, the effective resistance of the grid-cathode circuit of triode $V_4$ increases approximately logarithmically, causing the voltage appearing at grid 18 to be logarithmically proportionate to the applied signal amplitude. This, in turn, reduces the plate-to-ground resistance of triode $V_4$ in the same proportion. Therefore, as the signal amplitude increases, the effective plate-to-ground resistance of triode $V_4$ decreases, and since this is in series with resistor $R_7$, this increases the ratio $$\frac{R_7+R_x}{R_x}$$

where $R_x$ is the plate-to-ground resistance of triode $V_4$. Since the output voltage, $E_{output}$, appears across $R_x$, and the effective input voltage, $E_{input}$, is impressed across the series circuit comprising $R_7$ and $R_x$, $$\frac{R_7+R_x}{R_x}=\frac{E_{input}}{E_{output}}$$

Therefore the ratio of input amplitude to output amplitude increases when the input signal amplitude increases, whereby the output level remains substantially unchanged when the input level increases. By the logarithmic ratio obtained as above described, in a typical design, the output level has been found to remain substantially constant to within 1.5 decibels of the specified nominal output level, with amplitude changes up to 20 db of the applied input signal, as shown graphically in the chart of Figure 2, obtained by actual measurement.

In a typical design, the following values of the components of the circuit of Figure 1 were employed:

| | |
|---|---|
| $V_3$, $V_4$ | 6SL7GT sections |
| $R_1$, $R_2$, $R_7$, $R_8$ | 470,000 ohms |
| $R_5$ | Approximately 10,000 ohms |
| $R_6$ | 22,000 ohms |
| $C_1$, $C_2$, $C_4$ | .02 mfd. |
| $C_6$ | 20 mfd., 50 volts |

Preliminary adjustment of the circuit may be performed as follows:

Apply a 1000 cycle audio voltage to the input terminals. Set resistor $R_5$ at maximum resistance and increase the input voltage to the point where compression begins. Measure the input voltage, then increase the input voltage to five times the measured amount, and adjust resistor $R_5$ to provide the same output as at the previous input.

Limiting action should now maintain the output level within about 1 db of the specified value over at least a 20 db change in input.

Readjustment may be necessary whenever the limiter triode $V_4$ is replaced.

Figure 3 illustrates a modified form of the volume limiting circuit of the present invention, wherein additional triodes $V_1$ and $V_2$ are employed ahead of triode $V_3$, and wherein the filter condenser $C_3$ is connected between the grid 15 of triode $V_3$ and the ground wire 13, instead of connecting a filter condenser $C_6$ across the cathode load resistor $R_5$, as in Figure 1. In the circuit of Figure 3, one terminal of the coupling condenser $C_1$ is connected to the input terminal 11 and the other terminal of said coupling condenser is connected by a wire 23' to the resistor $R_7$. Connected in series between wire 23' and ground wire 13 are the condenser $C_2$, the resistor $R_1$ and the resistor $R_2$. Connected to the junction of resistors $R_1$ and $R_2$ is the grid 26 of the triode $V_1$. The plate 27 of triode $V_1$ is connected by a wire 28 to the positive terminal $E_b$ of the power supply. The cathode 29 of triode $V_1$ is connected through a cathode resistor $R_3$ to the ground wire 13. Tube $V_2$ has its grid 31 and plate 32 connected together by wire 33, as shown, whereby tube $V_2$ functions as a diode. Cathode 29 of triode $V_1$ is coupled through a condenser $C_5$ to wire 33, an input resistor $R_9$ being connected between wire 33 and ground wire 13. Connected between the cathode 30 of tube $V_2$ and ground wire 13 is the cathode load resistor $R_4$. Cathode 30 is connected directly to grid 15 of triode $V_3$ by a wire 34.

The use of the tubes $V_1$ and $V_2$ in the manner above described permits the filter condenser $C_3$ to be connected from the grid 15 of triode $V_3$ to ground instead of from the cathode 14 of triode $V_3$ to ground, whereby no current flows to discharge said condenser except through the resistor $R_4$. Thus, the diode $V_2$ only conducts on peak signals, charging the filter condenser $C_3$ and thereby applying an immediate D. C. voltage to the grid 15 of triode $V_3$ which leaks off at a comparatively slow rate. This provides instantaneous compression even on high amplitude single peaks.

It will be seen that the triode cathode follower stage comprising $V_1$ and its associated elements feeds the diode cathode follower stage comprising $V_2$ and its associated elements, and the rectified output of $V_2$ is applied to the grid 15 of $V_3$, which then functions as a cathode follower to control the effective plate-to-ground resistance of triode $V_4$.

In a typical design, the following values were employed for the elements of the circuit of Figure 3:

| | |
|---|---|
| $V_1$, $V_2$, $V_3$, $V_4$ | 6SL7GG sections |
| $R_1$, $R_2$, $R_7$, $R_8$ | 470,000 ohms |
| $R_3$, $R_6$, $R_9$ | 22,000 ohms |
| $R_4$ | 1,000,000 ohms |
| $R_5$ | Approximately 10,000 ohms |
| $C_1$, $C_2$, $C_4$ | .02 mfd. |
| $C_3$ | .004 mfd. |
| $C_5$ | 20 mfd., 50 volts |

The input voltage in a typical case, for maximum compression was 30 volts. The output voltage was approximately .5 volt during compression.

For the circuit of either Figure 1 or Figure 3 a plate supply of from 100 to 300 volts should be employed, preferably regulated, with an internal impedance to all frequencies in the range for which compression is to be provided of less than 100 ohms.

In the circuit of Figure 1, triode $V_3$ functions essentially as a rectifier, whereas in the circuit of Figure 3, triode $V_3$ functions as a cathode follower instead of as a rectifier, rectification being accomplished by diode $V_2$.

While certain specific embodiments of volume-compressing circuits have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A volume limiting circuit of the character described comprising a pair of input terminals, a vacuum tube having a cathode, a grid, and a plate, a resistor, circuit means connecting said resistor in series with the plate-cathode circuit of said vacuum tube across said input terminals, a pair of output terminals connected across said plate-cathode circuit, conductor means directly connecting one of the input terminals to one of the output terminals, said cathode being connected directly to said conductor means, a cathode follower stage connected across said input terminals, a series resistor directly connecting the output of said cathode follower stage to the grid of said vacuum tube, and means whereby said output applies a voltage to said grid positive at all times with respect to said cathode, causing grid current to flow in said grid-cathode circuit, said grid current being supplied solely from the output of said cathode follower stage.

2. A volume limiting circuit of the character described comprising a pair of input terminals, a vacuum tube having a cathode, a grid, and a plate, a resistor, circuit means connecting said resistor in series with the plate-cathode circuit of said vacuum tube across said input terminals, a pair of output terminals connected across said plate-cathode circuit, conductor means directly connecting one of the input terminals to one of the output terminals, said cathode being connected directly to said conductor means, a cathode follower stage, a rectifier, circuit means connecting said input terminals to said cathode follower stage through said rectifier, a series resistor directly connecting the output of said cathode follower stage to the grid of said vacuum tube, and means whereby said output applies a voltage to said grid positive at all times with respect to said cathode, causing grid current to flow in said grid-cathode circuit, said grid current being supplied solely from the output of said cathode follower stage.

3. A volume limiting circuit of the character described comprising a pair of input terminals, a vacuum tube having a cathode, a grid, and a plate, a resistor, circuit means connecting said resistor in series with the plate-cathode circuit of said vacuum tube across said input terminals, a pair of output terminals connected respectively to said plate and cathode, conductor means directly connecting one of the input terminals to one of the output terminals, said cathode being connected directly to said conductor means, a cathode follower stage, a signal-rectifying circuit connected to said input terminals, said signal-rectifying circuit including a load resistor in its output portion, a filter condenser connected across said load resistor, circuit means connecting said load resistor to the input circuit of the cathode follower stage, a series resistor directly connecting the output of said cathode follower stage to the grid of said vacuum tube, and means whereby said output applies a voltage to said grid positive at all times with respect to said cathode, causing grid current to flow in said grid-cathode circuit, said grid current being supplied solely from the output of said cathode follower stage.

4. A volume limiting circuit of the character described comprising a pair of input terminals, a vacuum tube having a cathode, a grid, and a plate, a resistor, circuit means connecting said resistor in series with the plate-cathode circuit of said vacuum tube across said input terminals, a pair of output terminals connected across said plate-cathode circuit, conductor means directly connecting one of the input terminals to one of the output terminals, said cathode being connected directly to said conductor means, a cathode follower stage connected across said input terminals, an adjustable impedance in the output of said cathode follower stage, a series resistor directly connecting the output of said cathode follower stage to the grid of said vacuum tube, and means whereby said output applies a voltage to said grid positive at all times with respect to said cathode, causing grid current to flow in said grid-cathode circuit, said grid current being supplied solely from the output of said cathode follower stage.

5. A volume limiting circuit of the character described comprising a pair of input terminals, a vacuum tube having a cathode, a grid, and a plate, a resistor, circuit means connecting said resistor in series with the plate-cathode circuit of said vacuum tube across said input terminals, a pair of output terminals connected across said plate-cathode circuit, conductor means directly connecting one of the input terminals to one of the output terminals, said cathode being connected directly to said conductor means, a cathode follower stage, means connecting said cathode follower stage to said input terminals and arranged to provide at its output a rectified voltage varying in accordance with the amplitude of the signal voltage applied to said input terminals, a series resistor directly connecting the output of the cathode follower stage to the grid of said tube, and means whereby said output applies a voltage to said grid positive at all times with respect to said cathode, causing grid current to flow in said grid-cathode circuit, said grid current being supplied solely from the output of said cathode follower stage.

6. A volume limiting circuit of the character described comprising a pair of input terminals, a vacuum tube having a cathode, a grid and a plate, a resistor, circuit means connecting said resistor in series with the plate-cathode circuit of said vacuum tube across said input terminals, a pair of output terminals connected across said plate-cathode circuit, conductor means directly connecting one of the input terminals to one of the output terminals, said cathode being connected directly to said conductor means, a cathode follower stage, means connecting the input circuit of the cathode follower stage to said input terminals, and a series resistor directly connecting the output circuit of said cathode follower stage to the grid of the vacuum tube and arranged to apply D. C. voltage to said grid positive at all times with respect to said cathode, whereby grid current flows in the grid-cathode circuit of said tube, said grid current being supplied solely from the output circuit of the cathode follower stage and said grid current varying in accordance with variations in the amplitude of the signal voltage applied to said input terminals.

7. A volume limiter circuit of the character described comprising a vacuum tube, a resistor connected in series with the plate-cathode circuit of the tube, means for connecting a signal voltage source across said resistor and plate-cathode circuit and for connecting an output circuit across said plate-cathode circuit, said means including a common conductor element connected directly to the cathode of the tube, a rectifying circuit having a cathode follower output, said rectifying circuit being connected across said resistor and plate-cathode circuit, a series resistor directly connecting the cathode follower output of the rectifying circuit to the grid of the tube and arranged to apply D. C. voltage to the grid of the tube positive at all times with respect to said cathode, whereby the effective resistance of the plate-cathode circuit is controlled by the cathode follower output of the rectifying circuit, and means whereby the grid current in said tube is supplied solely by said cathode follower output.

References Cited in the file of this patent

UNITED STATES PATENTS

| Number | Name | Date |
|---|---|---|
| 2,112,278 | Foster | Mar. 29, 1938 |
| 2,263,683 | Rockwell | Nov. 25, 1941 |
| 2,341,336 | Singer | Feb. 8, 1944 |
| 2,507,145 | Dean | May 9, 1950 |